United States Patent Office 2,866,376
Patented Dec. 30, 1958

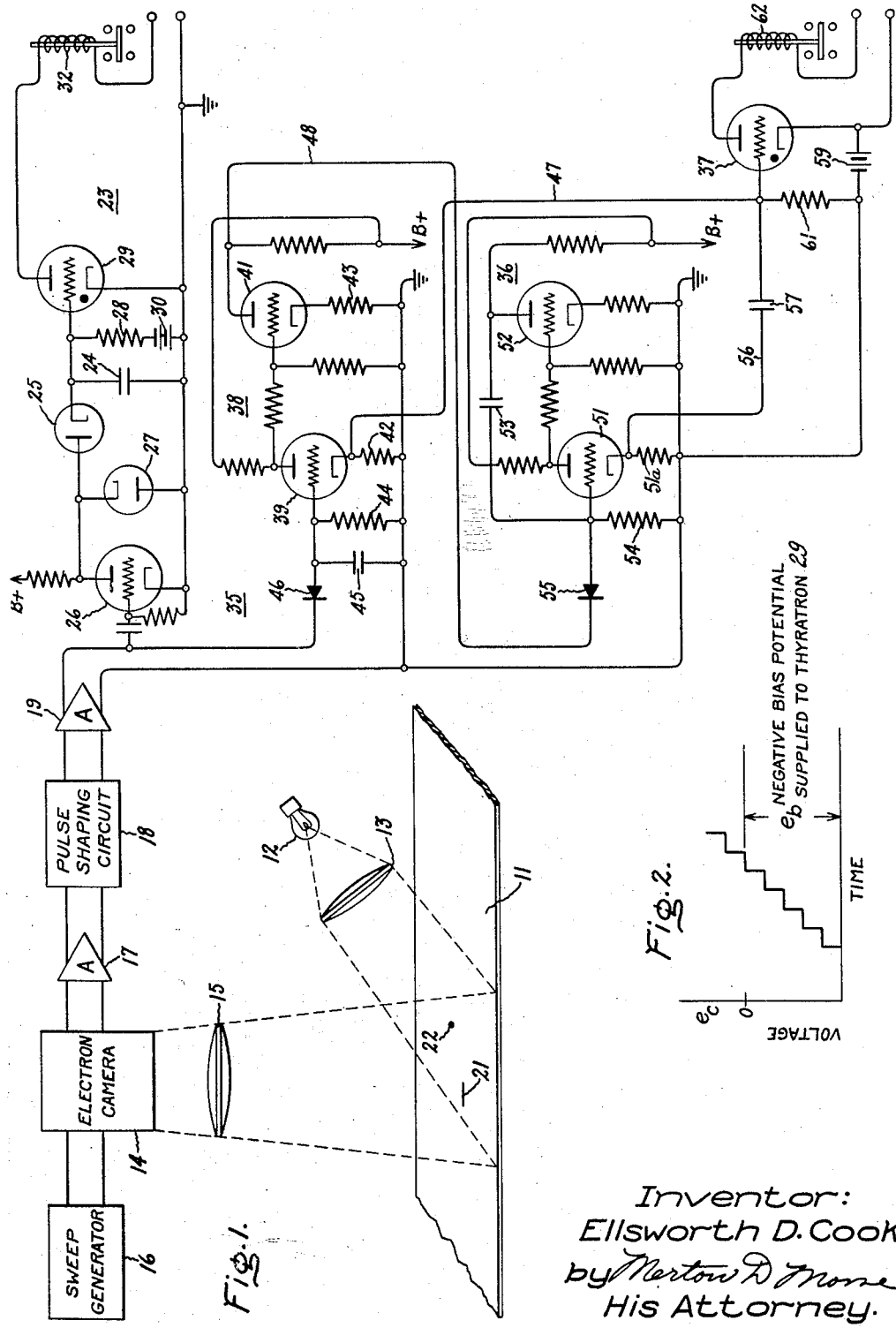

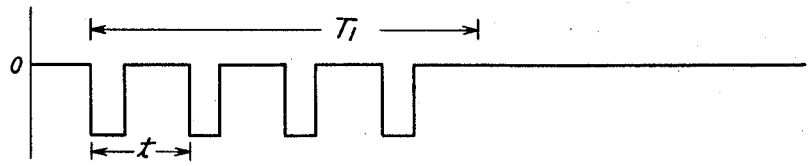
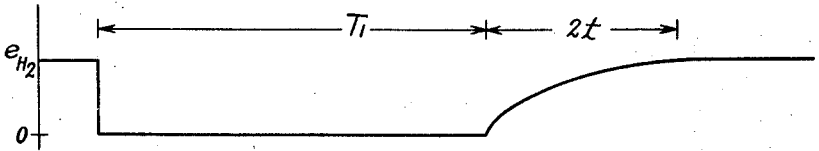
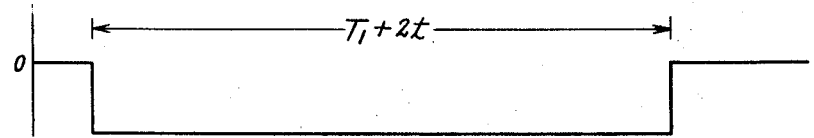
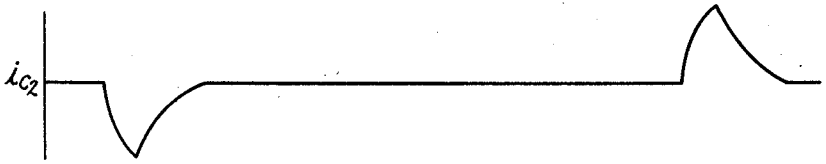
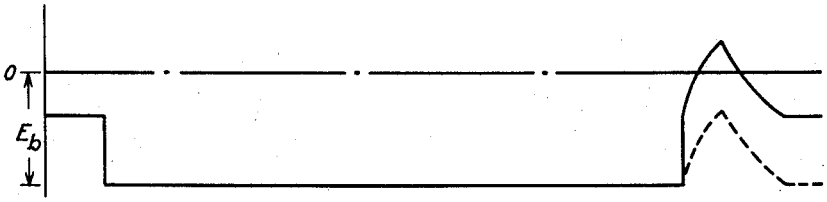
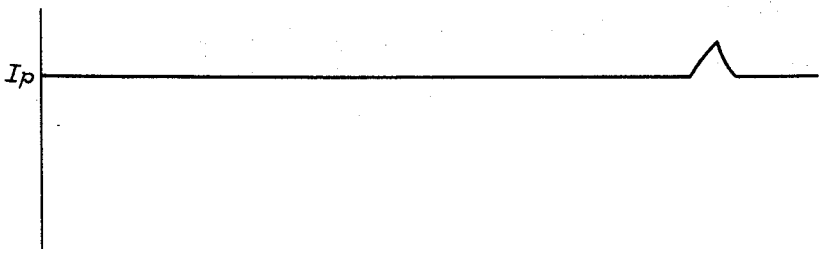

2,866,376

OPTICAL FLAW DETECTION APPARATUS

Ellsworth D. Cook, Scotia, N. Y., assignor to General Electric Company, a corporation of New York Application September 29, 1954, Serial No. 459,073

6 Claims. (Cl. 88—14)

The present invention relates to a new and improved indicating circuit for flaw inspection apparatus.

More specifically, the invention relates to an indicating circuit for flaw inspection apparatus which is capable of deriving output electric signals indicative of different types of flaws occurring in a material under inspection.

There are a number of known flaw inspection apparatus which can be used for inspecting a moving strip of material such as paper, tin, sheet steel, etc. for defects occurring therein, and to derive automatically an output signal indicative of the occurrence of a defect in the material. One such inspection apparatus is disclosed in patent application Serial No. 145,458, filed February 21, 1950, E. S. Sampson, "Blemish and Opacity Indicator," now abandoned, and assigned to the same assignee as the present invention. The number of uses for inspection apparatus of the type disclosed in the above-identified application have been somewhat restricted, however, due to the fact that known apparatus of this type are incapable of providing sufficient information concerning the flaws detected.

It is, therefore, one object of the present invention to provide a new and improved output circuit for sheet material inspection apparatus which is capable of differentiating between flaws occurring in the material in the direction of travel of the material, such as a crease or a fold, and flaws which are concentrated at substantially one point on the material.

Another object of the invention is to provide an output circuit for flaw detection apparatus which is capable of distinguishing between flaws of different character, and which is entirely reliable in operation.

A further object of the invention is to provide an output circuit for flaw detection apparatus having the above set forth characteristics, which is simple in construction and relatively inexpensive to manufacture.

In practicing the invention, an output circuit is provided for material inspection apparatus which includes an electron optics device. Although it is not limited to such means as for example inspection and scanning can be provided by spaced and insulated electrodes contacting a conductive medium and operating in conjunction with a commutation device to connect each electrode separately to the output circuit. In the present example, however, optical means are used, and are disposed intermediate the electron optics device and the material to focus an optical image of the material adjacent the inspection equipment on the electron optics device. Circuit means are coupled to the output of the electron optics device for differentiating between different types of flaws occurring in the material under inspection, and in the preferred embodiment of the invention, this circuit means comprises a storage circuit coupled to the output of the electron optics device for deriving an indication of the relatively large and extensive flaws occurring in the material under inspection. Also a flaw pulse count-controlled circuit is provided, and is coupled to the output of the electron-optics device in parallel with the storage circuit for deriving an indication of comparatively small flaws occurring in the material under inspection.

Other objects, features, and many of the attendant advantages of the invention will be appreciated more readily as the same becomes better understood by reference to the following detailed description when considered in connection with the accompanying drawings, wherein like parts are identified by the same reference character, and wherein:

Fig. 1 is a schematic circuit diagram of flaw detection apparatus which includes a novel output circuit constructed in accordance with the invention as a part thereof;

Fig. 2 is a graph showing the voltage vs. time charging characteristics of a capacitor comprising a part of the output circuit of the apparatus shown in Fig. 1; and Figs. 3a–3f are a series of graphs illustrating the charging voltage-time characteristics of a portion of the output circuit of the apparatus shown in Fig. 1.

The flaw detection apparatus shown schematically in Fig. 1 of the drawings is designed to detect flaws in a moving strip of material 11. For this purpose, the strip of material 11, which may be a moving sheet of paper, is illuminated from a light source 12, the light rays thereof being columnated by a columnating lens 13, and projected upon the surface of the moving sheet of paper. The illuminated area of the moving strip of material 11 is imaged upon an electron camera device 14 by a projection lens assembly 15 wherein an electric signal representative of the condition of the surface of the strip of material is produced. The electron optics device 14 preferably comprises an electron camera such as an image dissector, an orthocon, an iconoscope, or a phototube and associated mechanical scanner arrangement, an image dissector being preferred because of the signal to noise ratio at the high scanning rates at which it is capable of operating. Sweep signals are supplied to the electron optics device 14 from a sweep generator circuit, and the output electric signals developed by the electron optics device are supplied through an amplifier 17 to a pulse shaping circuit 18 which in certain applications might be a differentiating circuit and output amplifier 19. The construction and operation of the flaw detection apparatus thus far described is entirely similar to the apparatus described in the above-identified patent application of E. S. Sampson. Hence, for a more detailed description of the operation and construction thereof reference is made to such application. Briefly, however, the electron-optics device operates in the following manner: sweep generator 16 is connected to the horizontal scanning element of the electron optics device 14 to cause the same to scan the optical image formed at the camera transversely to the direction of motion of the strip of material 11. Preferably, the scanning rate is at least equal to the quotient of the speed that the strip of material 11 travels divided by the width of the scanning line so that the entire surface of the strip 11 is viewed by the camera. For example, if the scanning spot of the camera covers an area of the optical image of strip 11 equivalent to a circle 20 mils in diameter on the strip 11, and the strip travels a speed of 1500 feet per minute, the horizontal scanning rate should be at least 15,000 lines per second. As long as the surface of the sheet of material 11 remains at some predetermined standard quality, no output electric signal is produced by the electron camera 14, however, upon the occurrence of a blemish, fold, or crease in the surface of strip 11, an output signal pulse is produced by the electron optics device 14 which is passed through the amplifier 17, rectified by detector 18, and supplied to a suitable output circuit through output amplifier 19 to provide an output indication of the occurrence of the flaw.

While the flaw detection apparatus heretofore known have been satisfactory for many applications, they have not been sufficiently refined to differentiate between different types of flaws, some of which might be tolerated over others. For example, consider a crease or fold that extends in the direction of travel of the moving strip of material, such as is illustrated at 21. From a consideration of this crease it can be seen that as a scanning of electron optics device 14 is carried out, a pulsed electric output signal is produced each time the scanning beam of the electron optics device crosses through crease 21. Consequently, over a period of time, a series of periodic or nearly periodic signal pulses depending upon the direction of the longitudinal flaw between repeated scans will be produced, the pulses in the series being spaced apart by a time period determined by the time interval between consecutively repeated passages of scanning beam of the electron optics device to pass repetitively over the flaw. Upon the occurrence of such a series of repetitive pulses, therefore, it can be readily determined that a crease or fold or other extending flaw has occurred in the strip of paper, and that such crease or fold has a rather large dimension that extends in the direction of movement of strip of material. Consider now a flaw such as a spot shown at 22 on the strip of material, it can be appreciated that only one or possibly two at the most, electric output pulses will be produced as a scanning beam of the electron optics device 14 passes through the flaw. Consequently, the types of electric output signals produced by the electron optics device 14 do differ in character so that by distinguishing such differing signals, a means can be provided for differentiating between the different types of flaws. In the event that the quality requirements for a strip of material can tolerate a longitudinally extending fold or crease, such as shown at 21, then such flaws can be distinguished from other types of flaws which could not be tolerated. In this manner, flaw detection apparatus of the kind shown in Fig. 1, can be applied to a large number of additional applications for which it heretofore could not be used. The present invention provides an output circuit means for flaw detection apparatus which is capable of differentiating such varied types of flaws.

The output circuit provided by the present invention for the flaw detection apparatus includes a storage circuit means indicated generally at 23 for deriving an indication of relatively large and extensive flaws (that is, flaws exceeding some predetermined size) occurring in the material under inspection which have a considerable dimension extending in the direction of travel of the moving strip of material being gaged. The storage circuit means comprises a charging capacitor 24 coupled to the output of amplifier 19 through a diode rectifier 25. The rectifier 25 has the cathode thereof coupled to the output of electron optics device 14 through a coupling capacitor and a phase inverting amplifier 26 and is clamped to ground by a clamping diode 27. By reason of the construction, only positive-going charging pulses are supplied to the charging capacitor 24 through the diode rectifier 25. Coupled across the charging capacitor 24 is a grid resistor 28 which is in turn connected to the control grid of a grid controlled gas discharge tube 29. Gas discharge tube 29 has a grid biasing potential supplied thereto from a battery source of electric energy 30 through grid resistor, and has a suitable indicator such as a relay 32 connected to the plate circuit thereof. The biasing resistor 28 serves to apply the negative bias supplied by battery 30 to the control grid of gas discharge tube 29 to maintain that tube in a normally cut off condition, and also serves as a leakage resistance for the charging capacitor 24. Needless to say, the time constant of the RC circuit formed by the charging capacitor 24 and the resistor 28 is selected so that it is long with respect to the period of the scanning cycle (one scanning line) of electron optics device 14.

In operation, flaw signal indicating pulses produced by the electron optics device 14 are supplied from the pulse shaping circuits and amplifiers 18 and 19, respectively, and through rectifier 25 to the charging capacitor 24. In the event that the particular flaw being looked at by the optical system of the detection apparatus is elongated in the direction of movement of the strip 11 such as that shown at 21, a repetitive series of such pulses will occur. By applying this series of pulses to the charging capacitor 24 through rectifier 25, the total charge on the charging capacitor will build up in the manner indicated in Fig. 2 of the drawings wherein it is seen that as each subsequent pulse is applied to the charging capacitor, the total charge across the capacitor increases a predetermined amount. To prevent any accumulation of charge on capacitor 24 by negative-going pulses received from amplifier 19 with consequent blocking of the circuit, the plate of the rectifier 25 is returned to ground through the clamping diode 27. Hence, it is assured that the charge on charging capacitor 24 will build up in a linear manner as a result of the periodically recurring flaw indicating pulses applied thereto, and ultimately reaches a value sufficient to overcome the negative bias supplied to the control grid of gas discharge tube 29. Upon this occurrence, the gas within the tube ionizes, and the tube is rendered conductive allowing current to flow through the relay winding of relay 32 and providing an outward indication of the occurrence of a flaw. From a consideration of the charging voltage characteristic curve shown in Fig. 2, it can be appreciated that only flaws which have a long dimension extending in the direction of travel of the strip of material 11 produce a series of output pulses in the electron optics devices 14 which will be capable of building up a sufficient charge on the capacitor 24 to overcome the bias on the control grid of the gas discharge tube 29. Hence, the storage circuit 23 produces an indication of flaws of this nature only.

In addition to the above-described circuitry, a flaw pulse count controlled circuit means indicated generally at 35 also is connected to the output of the electron optics device 14 in parallel with the storage circuit means 23. The flaw pulse count controlled circuit means is provided in order to detect flaws of less than the predetermined size and comprises a gating circuit shown at 36 adapted to control the operation of a second grid controlled gas discharge tube 37 in conjunction with a trigger circuit 38 coupled across the output of the electron optics device 14 in the manner shown.

The trigger circuit 38 comprises a pair of cascade connected electron discharge tubes 39 and 41 having the cathodes thereof connected to cathode load resistors 42 and 43, respectively, and the anodes thereof connected through suitable plate load resistors to a source of positive plate potential. The anode of the electron tube 39 is connected through a suitable resistor coupling circuit to the control grid of the electron tube 41, and the control grid thereof is connected to a short time constant charging network comprising a resistor 44 and a capacitor 45. The short time constant charging network thus comprised is connected across the output of electron optics device 14 through a unidirectional coupling device comprising a rectifier 46 having the negative electrode element thereof connected directly to the output of the amplifier 19 so that only negative-going flaw signal pulses are passed to the short time constant charging network 44, 45. The network 44, 45 is designed to have a time constant in the order of $2t$ where $t$ is the approximate period of one scanning cycle (one scanning line) of electron optics device 14. Consequently, the charging network serves to apply a negative keying signal to the control grid of the first electron discharge tube 39 in the trigger circuit, and as tube 39 is designed to normally be conductive, the application thereto of the negative keying signal causes the same to be rendered non-conductive. Upon tube 39 becoming non-conductive, the positive potential is removed from the cathode of the vacuum tube 52 therefore the biased voltage of vacuum tube 37 drops to the potential of the battery 59. The output of trigger circuit 38 also is supplied through a conductor 48 connected to the input of the gating circuit 36.

Gating circuit 36 comprises a first electron discharge device 51 having the anode thereof coupled through a resistor coupling network to the control grid of a second electron discharge device 52. The anode electrode of electron discharge device 52 is turn coupled back through a capacitor 53 to the control grid of electron discharge device 51, and together with a grid biasing resistor 54 likewise connected to the control grid of electron discharge device 51, forms a resistance-capacitance charging network whose time constant is chosen in accordance with the size of the flaws to be detected. The control grid of electron discharge device 51 is also connected to the output of trigger circuit 38 through a conductor 48 and a unidirectional coupling device 55, and the signal supplied to discharge device 51 through this connection serves to control the operation of the gating circuit. The output of the gating circuit 36 is supplied through a conductor 56 connected to a load resistor 51a in the cathode circuit of electron discharge device 51 and an isolating capacitor 57 to the control grid of the second gas discharge tube 37.

The gating circuit 36 comprises a conventional one-shot multivibrator whose construction and operation is well-known in the electron circuitry art. Briefly, however, the circuit is biased so that electron discharge device 51 normally is conducting and device 52 is non-conducting. Upon the application of a negative flaw signal pulse to the control grid of device 51 from the trigger circuit 38, the device 51 is rendered non-conductive, and the positive voltage which was produced across the cathode load resistor 51a is removed. Upon the removal of this voltage the voltage differentiating action of the capacitor 57, resistor 61 combination causes a negative-going pulse to be applied to the grid of gas discharge device 37. Simultaneously, a negative charge is built up on capacitor 53 which maintains discharge device 51 cut-off until such time that the charge leaks off through resistor 54 whereupon discharge device 51 again becomes conductive. The time constant of the resistor-capacitor network 53, 54 determines the amount of time required for the charge on capacitor 53 to leak off, and hence the period of an operating cycle of the circuit. At the end of this time, discharge device 51 starts to conduct again and a positive voltage is again produced at the upper end of the cathode load resistor 51a of discharge device 51, which is supplied to the control grid of gas discharge device 37 as a positive-going pulse.

The second gas discharge tube 37 has a negative bias supplied thereto from a battery 59 connected to the control grid thereof through a biasing resistor 61, and has an indicator such as a relay 62 connected in the plate circuit thereof. Energizing potential is supplied to tube 37 from a source of alternating potential (not shown) connected to the plate of gas discharge tube 37 through the field winding of the indicator relay 62.

The operation of the flaw pulse count control circuit means can best be understood by reference to Fig. 3 of the drawings, wherein a graph representative of a series of negative-going flaw signal pulses is shown in Fig. 3a of the drawings. These negative flaw signal pulses are applied through the rectifier 46 to the short time constant charging network 44, 45. Assuming that the pulses have been produced by a flaw such as 21 occurring in the strip of material 11 under inspection, and that the periodic scanning of the electron optics device has resulted in the production of the series of pulses, the pulses may be said to have a period $t$ representative of one scanning cycle. The short time constant charging network 44, 45 is designed to have a time constant approximately equal to $2t$ so that it serves to supply a negative cut-off signal to the control grid of the electron discharge device 39 for a period of time equal to the number of pulses occurring in any series plus an additional period $2t$ required for the network to discharge. The negative biasing signal supplied to the control grid of electron discharge device 39 serves to cut off this device which normally is conductive. Upon electron tube 39 being rendered non-conductive, the positive voltage from the upper end of the cathode resistor 42 which is applied to the control grid of gas discharge device 37 through the conductor 47 is removed. Since the gas discharge tube 37 already is biased non-conductive by the grid biasing source 59, removal of this positive grid voltage has no effect on the device. The electron discharge device 41 is rendered conductive. However, due to the increase in plate potential of the electron discharge device 39, a negative-going signal pulse is produced in the plate circuit of device 41 that is supplied to the control grid of electron discharge device 51 in the gating circuit. The electron discharge device 51 normally is conductive so that the application of a negative pulse thereto from a trigger circuit renders this device non-conductive. Electron discharge devices 51 and 52 comprise a one shot multivibrator which will return to its initial state of operation after a period determined by the time constant of the resistor-capacitor network formed by capacitor 53 and resistor 54. Consequently, the gating circuit 36 is keyed on and off by the negative-going triggering pulses supplied thereto by a trigger circuit 38, and is caused to pass through one cycle of operation for each series of negative going flaw signal pulses supplied to the trigger circuit. Upon the gating circuit 36 being triggered from its initial operating condition to the other thereof, the electron discharge device 51 becomes non-conductive thus resulting in a removal of the positive direct current potential at the upper end of the cathode load resistor 51a. Upon removal of the positive unidirectional potential from the cathode load resistor 51a a negative voltage pulse is supplied to the control grid of the gas discharge device 37 due to the differentiating action of the capacitor 57. As gas discharge device 37 is not conducting, the negative signal pulse supplied thereto in this manner has no effect on its operation. However, upon the gating circuit 36 returning to its initial condition due to the charge on capacitor 53 having leaked off through resistor 54 and discharge device 51 having again become conductive, a positive potential is produced across the cathode load resistor 51a of electron discharge device 51 which is supplied to the control grid of gas discharge device 37 as a positive pulse. Should this positive going pulse coincide with or follow after the occurrence of a positive potential supplied to the control grid of discharge device 37 from the load resistor 42 of electron discharge device 39 in trigger circuit 38, the gas discharge device 37 is rendered conductive, and an output indication of a flaw is provided by this circuit.

The sequence of actions described above is best depicted in Figs. 3a through 3f of the drawing. For the purpose of illustration, assume that it is desired to detect flaws of a size which will produce four or less flaw signal pulses. It should be understood, however, that the circuit can be adjusted to operate on any desired number of flaw signal pulses, and hence any desired size flaw. The gating circuit 36 is designed to have a period of operation $T_1+2t$ where $T_1$ is a total time elapsed or required for the chosen maximum number of flaw signals to be produced by a desired flaw size. If it is necessary to detect flaws of greater size or of less size, $T_1$ can be varied in length to accommodate this need. Upon the occurrence of a flaw of such a size to produce four flaw signal pulses passing within the view of electron optics device 14, then, as shown in Fig. 3b (which depicts the grid voltage of electron discharge device 39), the electron discharge device 39 in the trigger circuit 38 is rendered non-conductive for a period of time $T_1$ plus the time $2t$ required for the charge on short time constant charging network 44, 45 to leak off. Fig. 3c depicts the change in voltage appearing across the resistor 42 with time upon such occurrence wherein it can be seen that the potential across resistor 42 drops to zero and does not rise again to its normal positive value until a period $T_1+2t$ later.

The signal pulses produced across the load resistor 51a in the cathode circuit of electron discharge device 51 are of the same general configuration as that illustrated in Fig. 3c and will be of the same duration ($T_1+2t$) each time the discharge device 51 is cut off. The current flow in the circuit, which includes load resistor 51a, isolating capacitor 57, and biasing resistor 61 which results from the voltage produced across the load resistor 51a, is illustrated in Fig. 3d of the drawing. It is seen that upon electron discharge device 51 being rendered non-conductive, a negative current pulse flows through the circuit and at the end of a period $T_1+2t$ a positive current pulse flows. The resultant voltage drop across the biasing resistor 61 then will have substantially the same wave shape. By combining the graphs shown in Figs. 3c and 3d, a composited graph 3e is shown which depicts the voltage values appearing across the resistor 61 due to the negative pulses from both load resistors 42 and 51a. From Fig. 3e of the drawings, it can be appreciated that the negative bias supplied to the control grid of the gas discharge device 37 by the biasing battery 59 is adjusted so that the normal direct current flow through resistor 61 by the D. C. potential supplied from resistor 42 is below the reference or cut-off value of this gas discharge tube, in this instance assumed to be zero volts. Upon the electron discharge device 39 being rendered non-conductive due to the occurrence of a negative flaw signal pulse, this potential (from resistor 42) is reduced to zero so that the full value of the bias potential supplied by the battery 59 is effective to maintain gas discharge tube 37 at cut-off. Upon the end of the period $T_1+2t$, however, the bias potential supplied from resistor 42 through conductor 47 is again applied to the control grid of the gas discharge device. This potential, when combined with the positive pulse supplied by the gating circuit 36 and produced as a result of the electron discharge device 51 again being rendered conductive at the end of one cycle of operation, raises the potential of the control grid of the gas discharge device 37 above the cut-off value, and causes the device to become conductive. The resultant plate current flow is indicated in Fig. 3f of the drawing, wherein it is seen that a positive going pulse is produced which is sufficient to actuate the indicator relay 62. The short pulse which appears on this current wave form is due to the excitation voltage applied to the plate of the discharge device 37. In the event that more than the predetermined number of flaw signal pulses occur, it can be appreciated that the no direct current biasing potential supplied through conductor 47 from the cathode load resistor 42 to the control grid of gas discharge device at a time sufficient to coincide with the production of the positive going pulse supplied by the gating circuit 36. Consequently, the circuit will not respond to flaws of a size large enough to produce more than four flaw signal pulses in any one series, in the output of the electron optics device 14. However, should there be four flaw signal pulses, or fewer, it can be appreciated that the direct current biasing potential supplied from the cathode load resistor 42 through conductor 47 to the control grid of gas discharge device 37, will be present upon the production of the positive going pulse produced by the gating circuit 36 at the end of one cycle of operation thereof, and hence an indication will be produced in the output circuit that a desired size flaw has occurred in the material under inspection. Consequently, it is believed clear that the flaw signal count-controlled circuit means described above is capable of selecting flaws having any desired size, and indicating the occurrence of such flaws.

From the foregoing description, it can be appreciated that the invention comprises a new and improved output circuit for flaw detection apparatus which is capable of differentiating between flaws occurring in the material which have some length in the direction of travel of the material such as a crease or a fold, and flaws which are concentrated at substantially one point and are relatively small. Additionally, the circuit for accomplishing this is entirely reliable in operation, and is relatively simple in design and inexpensive to manufacture.

Obviously, other modifications and variations of the present invention can be suggested by those skilled in the art in the light of the above teachings. It is, therefore, to be understood that changes may be made herein which are within the full intended scope of the present invention and as defined by the appended claims.

What I claim as new and desire to secure by Letters Patent of the United States is:

1. In material inspection apparatus which includes optical means disposed to focus an optical image of the portion of the material adjacent an inspection apparatus on an electron-optics device and means for providing scanning of the image by the electron-optics device, the improvement of a storage circuit comprising a unidirectional conducting device operatively coupled in series circuit relationship with an energy storage device across the output of said electron-optics device, a grid controlled discharge tube for providing an output signal having said energy storage device coupled thereto, said apparatus further including a gating circuit coupled across the output of said electron-optics device, a second grid-controlled gas discharge tube for providing a second output signal having the control grid thereof operatively coupled to the output of said gating circuit, and a trigger circuit operatively coupled to the output of said electron-optics device and having the output thereof coupled to said gating circuit and to the control grid of said second discharge tube in parallel with gating circuit for controlling the action of the same.

2. In material inspection apparatus which includes optical means disposed to focus an optical image of the portion of the material adjacent the inspection equipment on an electron-optics device and means for providing scanning of the image by the electron-optics device, the improvement of storage circuit means coupled to the output of said electron-optics device and comprising a grid controlled discharge device having a charging capacitor connected in the control grid circuit thereof, said storage circuit means serving to derive an indication of flaws occurring in the material under inspection which have a relatively large dimension perpendicular to the direction of scanning, and flaw pulse count controlled circuit means coupled to the output of said electron-optics device and comprising a second grid-controlled discharge device, a gating circuit operatively coupled to said discharge device for supplying a gating signal thereto, a trigger circuit coupled to the control grid of said second discharge device in parallel circuit relationship with said gating circuit, and coupled to control said gating circuit, and a coupling circuit for coupling said trigger circuit to the output of said electron-optics device, said flaw pulse count-controlled circuit means serving to derive an indication of flaws occurring in the material under inspection having a comparatively small dimension perpendicular to the direction of scanning.

3. In material inspection apparatus which includes a scanning electron-optics device and optical means disposed intermediate said electron-optics device and said material for focusing an optical image of the portion of the material adjacent the inspection apparatus on the electron-optics device, the improvement of a storage circuit comprising a diode rectifier operatively coupled in series circuit relationship with a charging capacitor, said series circuit being connected to receive the output of said electron-optics device, a grid-controlled gas discharge tube having said charging capacitor connected in the cathode-control grid circuit thereof, and an indicating device connected in the plate circuit of said gas discharge tube, said apparatus further including flaw pulse count-controlled circuit means coupled across the output of said electron-optics device and comprising a second grid-controlled gas discharge device, a gating circuit having the output thereof operatively coupled to the control grid of said second gas discharge device, a trigger circuit having one output thereof coupled to the control grid of said second gas discharge device in parallel circuit relationship with said gating circuit and having another output thereof coupled to the input of said gating circuit, and a short time constant resistor-capacitor charging network coupled across the output of said electron-optics device and having the input terminals of said trigger circuit coupled thereacross.

4. In material inspection apparatus which includes optical means disposed to focus an optical image of the portion of the material adjacent the inspection apparatus on an electron-optics device and means for providing scanning of the image by the electron-optics device, the improvement of a storage circuit comprising a diode rectifier operatively coupled in series circuit relationship with a charging capacitor across the output of said electron-optics device, a grid-controlled gas discharge tube having said charging capacitor connected in the cathode-control grid circuit thereof, and an indicating device connected in the plate circuit of said gas discharge tube, said apparatus further including flaw pulse count-controlled circuit means coupled across the output of said electron-optics device and comprising a second grid-controlled gas discharge tube having an indicating relay connected in the anode circuit and energized by a source of alternating current electric energy, a gating circuit comprising a one shot multivibrator that automatically returns to its initial operating condition upon being triggered from its initial operating condition to the other, a coupling capacitor for coupling the output of said one shot multivibrator to the control grid of said second gas discharge device, a trigger circuit comprising first and second grid controlled electron discharge tubes connected in series, said first electron discharge tube having a cathode load resistor operatively coupled to the control grid of said second gas discharge device and said second electron discharge tube having the anode thereof coupled through a unidirectional conducting device to the input of said one shot multivibrator, and a short time constant resistor capacitor charging network coupled across the output of said electron-optics device and having the input terminals of said trigger circuit coupled thereacross.

5. An output circuit for inspection apparatus including in combination a grid-controlled gas discharge device, a gating circuit having the output thereof operatively coupled to the control grid of said gas discharge device, a trigger circuit having one output thereof coupled to the control grid of said gas discharge device in parallel circuit relationship with said gating circuit and having another output thereof coupled to the input of said gating circuit and a short time constant resistor-capacitor charging network coupled across the input terminals of said trigger circuit for supplying input signals thereto, said output circuit means serving to provide an indication of only comparatively small numbers of flaw signal pulses.

6. An output circuit for inspection apparatus including in combination a grid-controlled gas discharge tube having an indicating relay connected in the anode circuit and energized by a source of alternating current electric energy, a gating circuit comprising a one shot multivibrator that automatically returns to its initial operating condition upon being triggered from one operating condition to the other, a coupling capacitor for coupling the output of said one shot multivibrator to the control grid of said gas discharge device, a trigger circuit comprising first and second grid controlled electron discharge tubes connected in series, said first electron discharge tube having a cathode load resistor operatively coupled to the control grid of said second gas discharge device and said second electron discharge tube having the anode thereof coupled through a unidirectional conducting device to the input of said one shot multivibrator, and a short time constant resistor capacitor charging network coupled across the input terminals of said trigger circuit, said output circuit means serving to provide an indication of only comparatively small numbers of flaw signal pulses.

References Cited in the file of this patent

UNITED STATES PATENTS

| | | |
|---|---|---|
| 2,295,000 | Morse | Sept. 8, 1942 |
| 2,393,631 | Harrison et al. | Jan. 29, 1946 |
| 2,494,441 | Hillier | Jan. 10, 1950 |
| 2,563,213 | Coleman | Aug. 7, 1951 |
| 2,594,423 | Gordon | Apr. 29, 1952 |

FOREIGN PATENTS

| | | |
|---|---|---|
| 714,344 | Great Britain | Aug. 25, 1954 |
| 714,350 | Great Britain | Aug. 25, 1954 |
| 157,888 | Australia | July 28, 1954 |